(12) United States Patent
Salter et al.

(10) Patent No.: US 9,839,098 B2
(45) Date of Patent: Dec. 5, 2017

(54) LIGHT ASSEMBLY OPERABLE AS A DOME LAMP

(71) Applicant: Ford Global Technologies, LLC, Dearborn, MI (US)

(72) Inventors: Stuart C. Salter, White Lake, MI (US); Jeffrey Singer, Plymouth, MI (US); Pietro Buttolo, Dearborn Heights, MI (US); Arun Kumar, Farmington Hill, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 14/819,949

(22) Filed: Aug. 6, 2015

(65) Prior Publication Data

US 2015/0367776 A1    Dec. 24, 2015

Related U.S. Application Data

(63) Continuation-in-part of application No. 14/603,636, filed on Jan. 23, 2015, now Pat. No. 9,573,517, which
(Continued)

(51) Int. Cl.
| | |
|---|---|
| *B60Q 1/00* | (2006.01) |
| *B60Q 1/26* | (2006.01) |
| *H05B 37/02* | (2006.01) |
| *B60Q 3/82* | (2017.01) |
| *B60Q 3/74* | (2017.01) |
| *B60Q 3/68* | (2017.01) |
| *B60Q 3/80* | (2017.01) |

(52) U.S. Cl.
CPC ............ *H05B 37/0227* (2013.01); *B60Q 3/68* (2017.02); *B60Q 3/74* (2017.02); *B60Q 3/80* (2017.02); *B60Q 3/82* (2017.02); *H05B 37/0218* (2013.01); *Y02B 20/46* (2013.01)

(58) Field of Classification Search
CPC ... B60Q 3/00; B60Q 3/20; B60Q 3/51; B60Q 3/53; B60Q 3/54; B60Q 3/56; B60Q 3/68; B60Q 3/74; B60Q 3/745; B60Q 3/76; B60Q 3/80; B60Q 3/82; H05B 37/0218; H05B 37/0227
USPC .................. 362/487–488, 490, 509–510, 545
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

According to one aspect of the present invention, a light assembly of a vehicle is provided herein. The light assembly includes an array of light sources and a plurality of light-directing elements, each configured to direct light received from the light sources in an associated direction. A sensor arrangement is configured to sense a user-supplied action and a controller determines which light sources to activate in response to the sensed user-supplied action.

15 Claims, 12 Drawing Sheets

Related U.S. Application Data is a continuation-in-part of application No. 14/086,442, filed on Nov. 21, 2013.

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 6,013,956 A * | 1/2000 | Anderson, Jr. ........ B60K 35/00 307/10.1 |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,221,271 B2 * | 5/2007 | Reime ................ H05B 33/0803 340/540 |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0206392 A1 | 8/2012 | Ng et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0240618 A1 | 8/2014 | Oraw |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

US 9,839,098 B2

LIGHT ASSEMBLY OPERABLE AS A DOME LAMP

CROSS-REFERENCE TO THE RELATED APPLICATION

This application is a continuation-in-part of U.S. patent application Ser. No. 14/603,636, filed Jan. 23, 2015, entitled "DOOR ILLUMINATION AND WARNING SYSTEM," now U.S. Pat. No. 9,573,517, which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting and more particularly relates to vehicle light assemblies operable as dome lamps.

BACKGROUND OF THE INVENTION

Dome lamps in vehicles serve to illuminate the vehicle cabin. Provided herein is a light assembly that is operable as a dome lamp. The light assembly offers a variety of illumination schemes and benefits from a button-less design.

SUMMARY OF THE INVENTION

According to one aspect of the present invention, a light assembly of a vehicle is provided. The light assembly includes an array of light sources and a plurality of light-directing elements, each configured to direct light received from the light sources in an associated direction. A sensor arrangement is configured to sense a user-supplied action and a controller determines which light sources to activate in response to the sensed user-supplied action.

According to another aspect of the present invention, a light assembly of a vehicle is provided. The light assembly includes an array of light sources and a photoluminscent structure configured to luminesce in response to light excitation from the light sources. A plurality of light-directing elements are each configured to direct luminescent light received from the photoluminescent structure in an associated direction. A sensor arrangement is configured to sense a user-supplied action and a controller determines which light sources to activate in response to sensed user-supplied action.

According to yet another aspect of the present invention, a light assembly of a vehicle is provided. The light assembly includes a light-producing assembly having a plurality of light sources. A plurality of light-directing elements are each configured to direct light received from the light-producing assembly in an associated direction. A sensor arrangement is configured to sense a user-supplied action and a controller determines which light sources to activate in response to the sensed user-supplied action.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
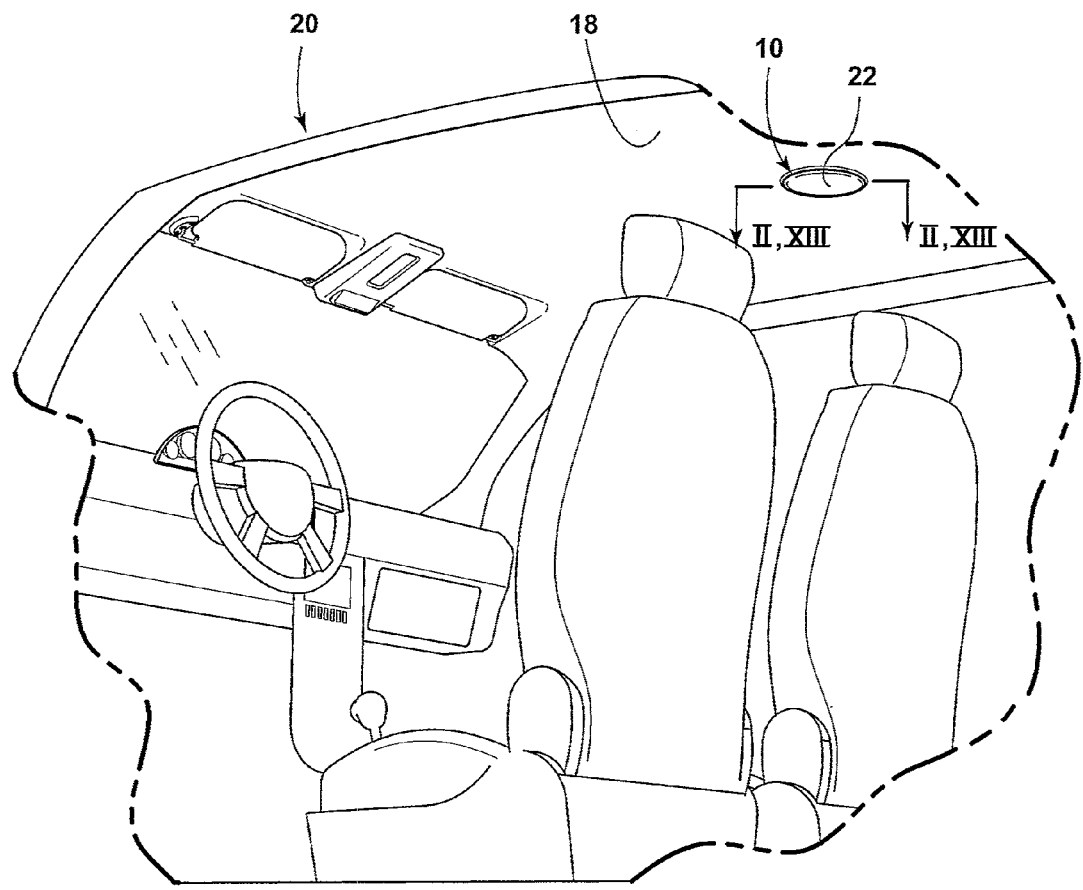
FIG. 1 is a perspective view of one embodiment of a light assembly, in which the light assembly is configured as a dome lamp.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-13, reference numeral 10 generally designates a light assembly for a vehicle 20. Light assembly 10 includes an array of light sources 12 and an optic 13 having a plurality of light-directing elements 14, each configured to direct light received from the light sources 12 in an associated direction. Light assembly 10 also includes a sensor arrangement 15 configured to register a motion by a user and a controller 16 for determining which light sources 12 to activate in response to the motion.

Referring to FIG. 1, light assembly 10 is shown configured as a dome lamp. As shown, light assembly 10 is coupled to a roof structure (e.g., headliner 18) of a vehicle 20. In the illustrated embodiment, an exposed portion 22 of the light assembly 10 corresponds to sensor arrangement 15 and functions as the primary manner in which a user activates light assembly 10. Sensor arrangement 15 covers light sources 12 and light-directing elements 14 and is substantially light permeable to allow light produced by light assembly 10 to be transmitted therethrough. As will be described in greater detail below, light assembly 10 is operable via a user-supplied action including a touch event, whereby a user uses a number of hand digits to contact the sensor arrangement 15. As defined herein, the term "hand digit" refers to a distal part of a hand, which may include the fingers and/or thumb. Depending on the number of hand digits used, the location in which the hand digit(s) contact the sensor arrangement 15, and in some instances, the direction in which the hand digit(s) move across the sensor arrangement 15, light assembly 10 will activate accordingly to illuminate one or more vehicle cabin areas. Such vehicle cabin areas may include driver side areas and passenger side areas in both the front and rear of the vehicle 20. Additionally or alternatively, the user may use his or her hand to make a gesture proximate to the sensor arrangement 15. Depending on the direction of the gesture, light assembly 10 will activate accordingly to illuminate one or more vehicle cabin areas. While the sensor arrangement 15 is shown and described herein as an integral part of light assembly 10, it is to be understood that sensor arrangement 15 may be elsewhere located within the vehicle cabin.

Figure 2:
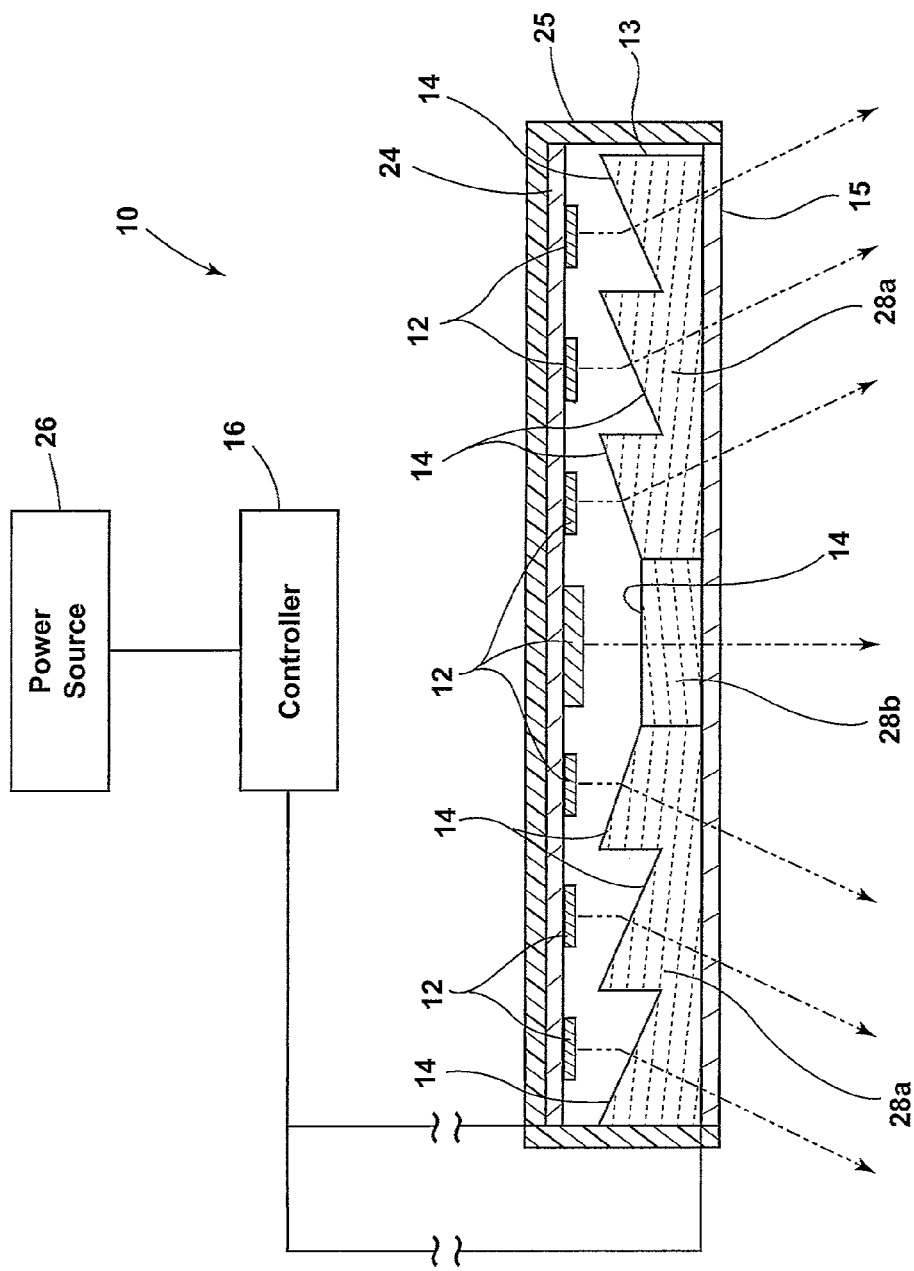
FIG. 2 is a cross-sectional view of the light assembly taken along line II-II of FIG. 1.

Referring to FIG. 2, a cross-sectional view of light assembly 10 is shown according to one embodiment. Light assembly 10 includes a printed circuit board (PCB) 24 on which the light sources 12 are located. Optic 13 is arranged to cover the light sources followed by sensor arrangement 15. The aforementioned components of the light assembly 10 may be secured within a housing 25, which in turn can be mounted to a structure of the vehicle 20.

Figure 3:
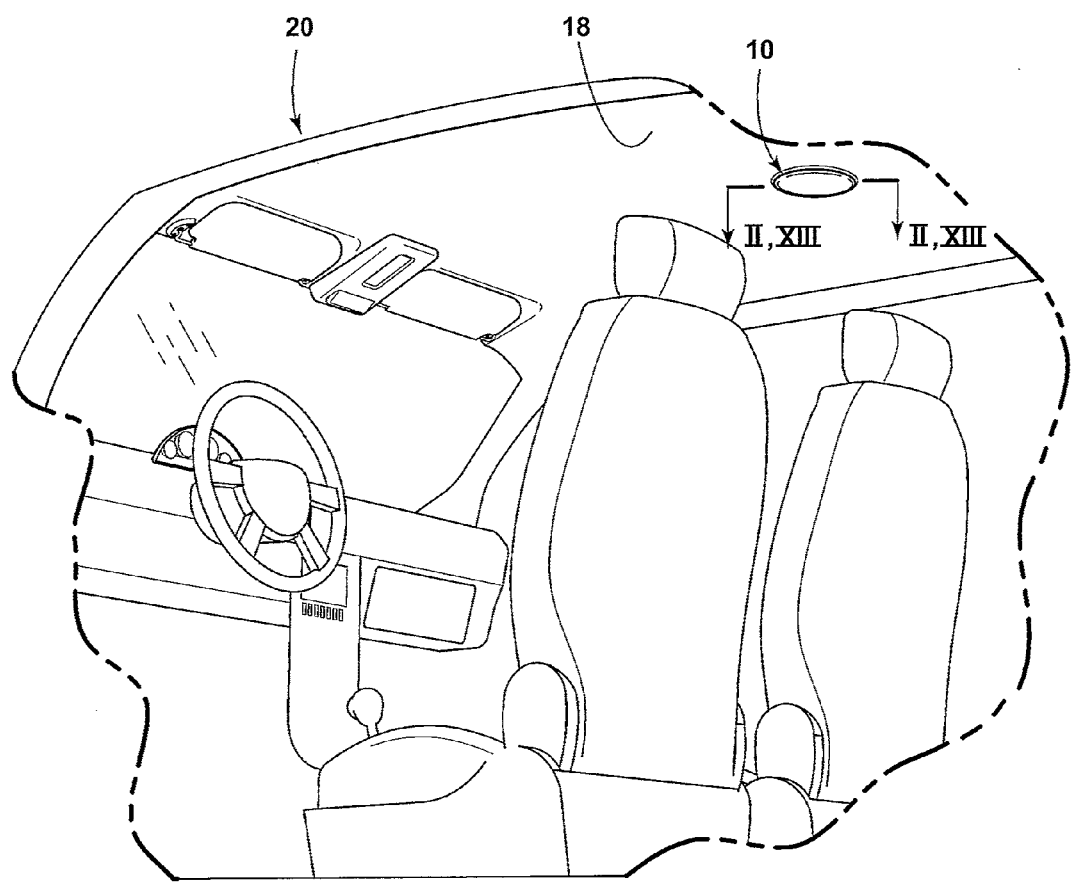
FIG. 3 illustrates one embodiment of an array of light sources on a printed circuit board.

Light sources 12 may be disposed on the PCB 24 with constant or variable spacing. Light sources 12 may include light emitting diodes (LEDs) of equal or different sizes. An exemplary array is shown in FIG. 3, wherein one of the light sources 12 is arranged in the center of the PCB 24 and the remaining light sources 12 are arranged in several rings thereabout. As is further shown in FIG. 3, the PCB 24 may have a circular configuration and the spacing between light sources 12 in the same ring may increase the closer they are to the edge of the PCB 24. The light sources 12 may be configured to emit any colored light and are electrically coupled to the controller 16. In operation, the controller 16 may selectively control the light sources 12 such that one, all, or a portion of the light sources 12 can be activated at any given time. The controller 16 may be located on the PCB 24 or elsewhere in the vehicle 20 and is electrically coupled to a power source 26, which includes a conventional vehicle power source or an independent power source.

Figure 4:
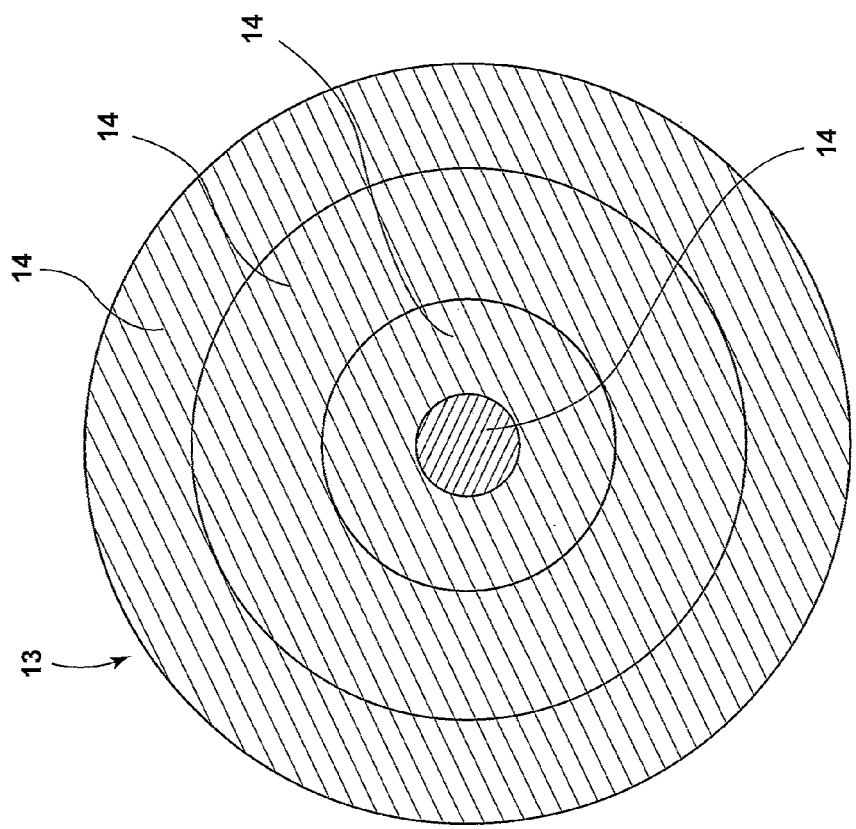
FIG. 4 illustrates one embodiment of an optic of the light assembly.
Figure 4:
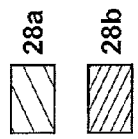

Optic 13 is arranged such that a portion 28a of the light-directing elements 14 is configured to output incident light at an angle and another portion 28b of the light-directing elements 14 is configured to output incident light at a zero angle as demonstrated by the light rays in FIG. 2. In the illustrated embodiment, portion 28b may include a single light-directing element 14 having a planar shape whereas portion 28a includes a plurality of light-directing elements 14 in a sawtooth arrangement for directing incident light away from the center of the optic 13. As shown in FIG. 4, the light-directing element 14 of portion 28b may have a circular shape and is located at the center of the optic 13 whereas the light-directing elements 14 of portion 28a are each arranged as rings that are concentric with portion 28b. In assembly, the optic 13 is positioned relative the PCB 24 such that the light-directing element 14 of portion 28b is in optical communication with the light source 12 located at the center of the PCB 24 and the light-directing elements 14 of portion 28a are in optical communication with a corresponding ring of light sources 12.

Figure 5:
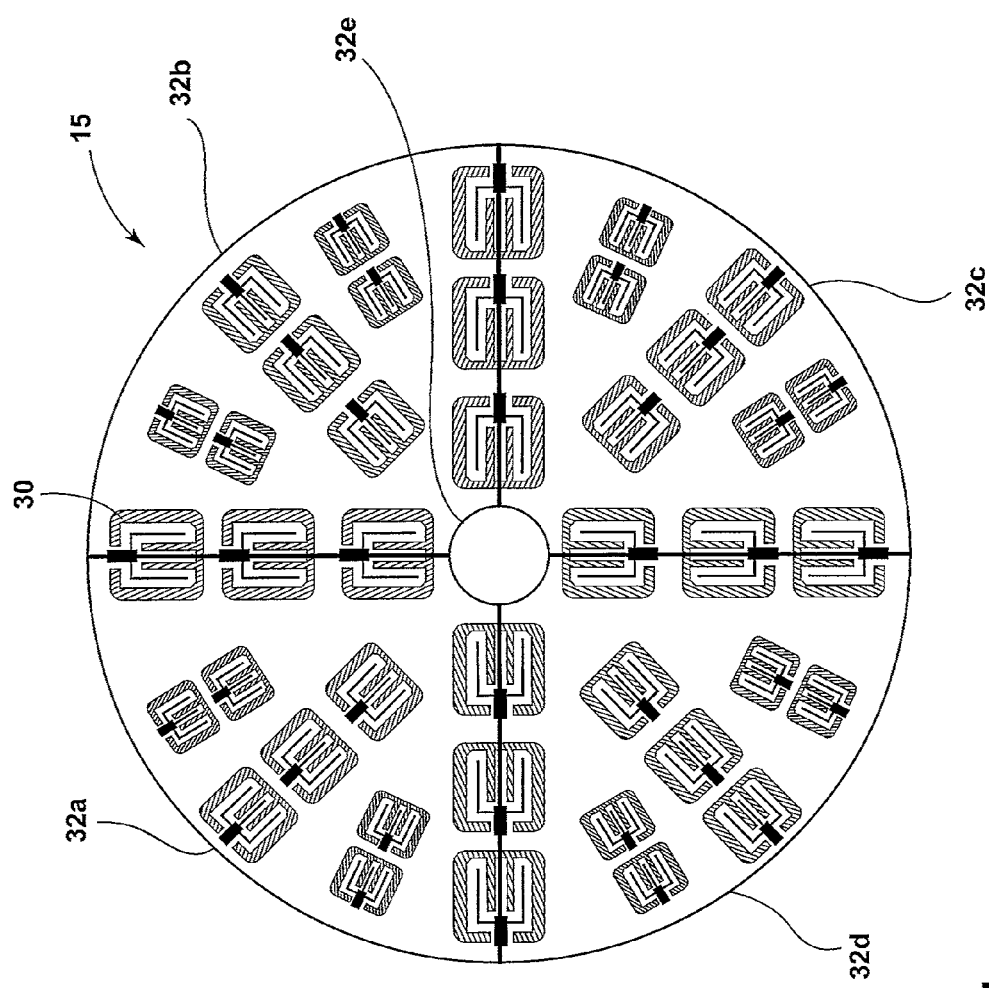
FIG. 5 illustrates one embodiment of a sensor arrangement of the light assembly.

Sensor arrangement 15 may also be electrically coupled to the controller 16 and includes an array of proximity sensors 30 as exemplarily shown in FIG. 5. The proximity sensors 30 may include capacitive sensors or other sensors configured to sense a user-supplied action such as a touch event and/or a gesture. Capacitive sensors generally detect changes in capacitance due to the placement or movement of an object such as a finger proximate to or in contact with the sensor, thereby allowing a variety of user-supplied actions to be effectuated on the sensor arrangement 15 to control the light output of the light assembly 10. Examples of user-supplied actions, described in greater detail herein, include using a one or more hand digits to tap or swipe the sensor arrangement 15 as well as using hand gestures proximate the sensor arrangement 15. In alternative embodiments, the sensor arrangement 15 may include other types of proximity sensors such as, but not limited to, magnetic sensors, inductive sensors, optical sensors, resistive sensors, temperature sensors, the like, or any combination thereof.

Figure 6:
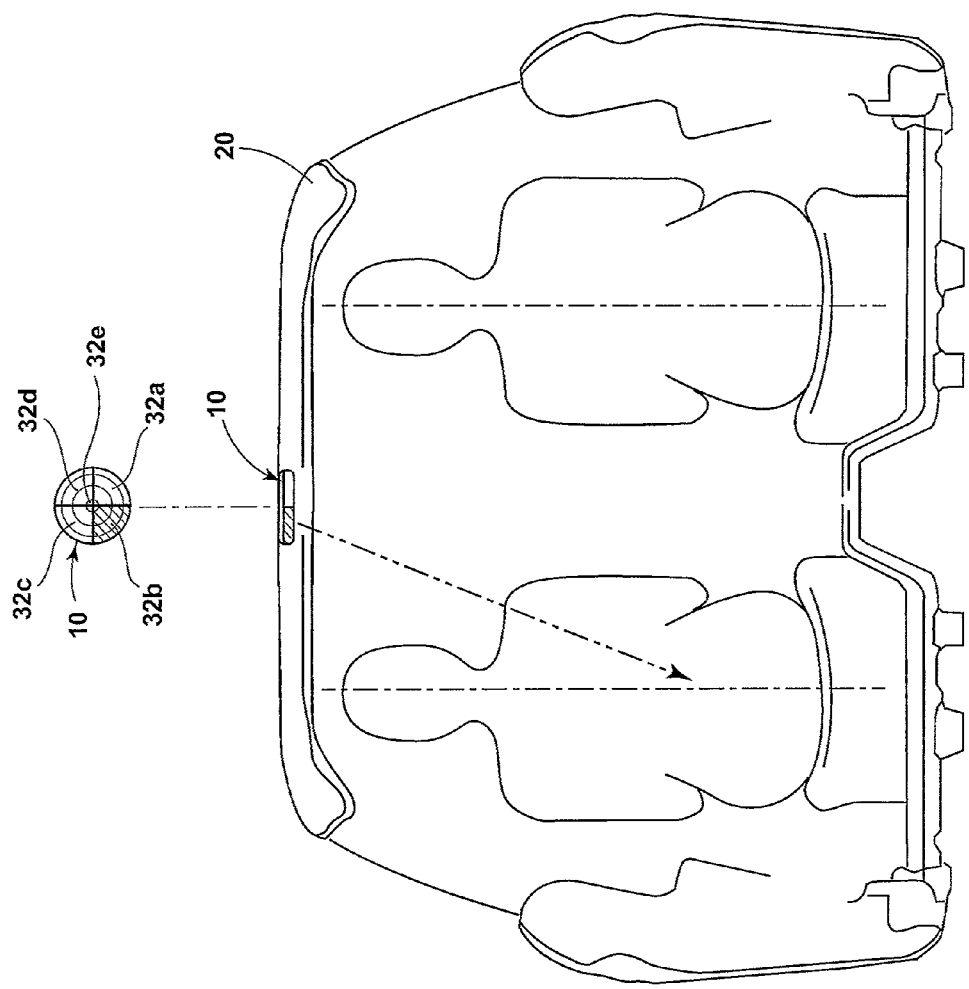
FIGS. 6-9 illustrates a variety of illumination schemes using the light assembly.
Figure 7:
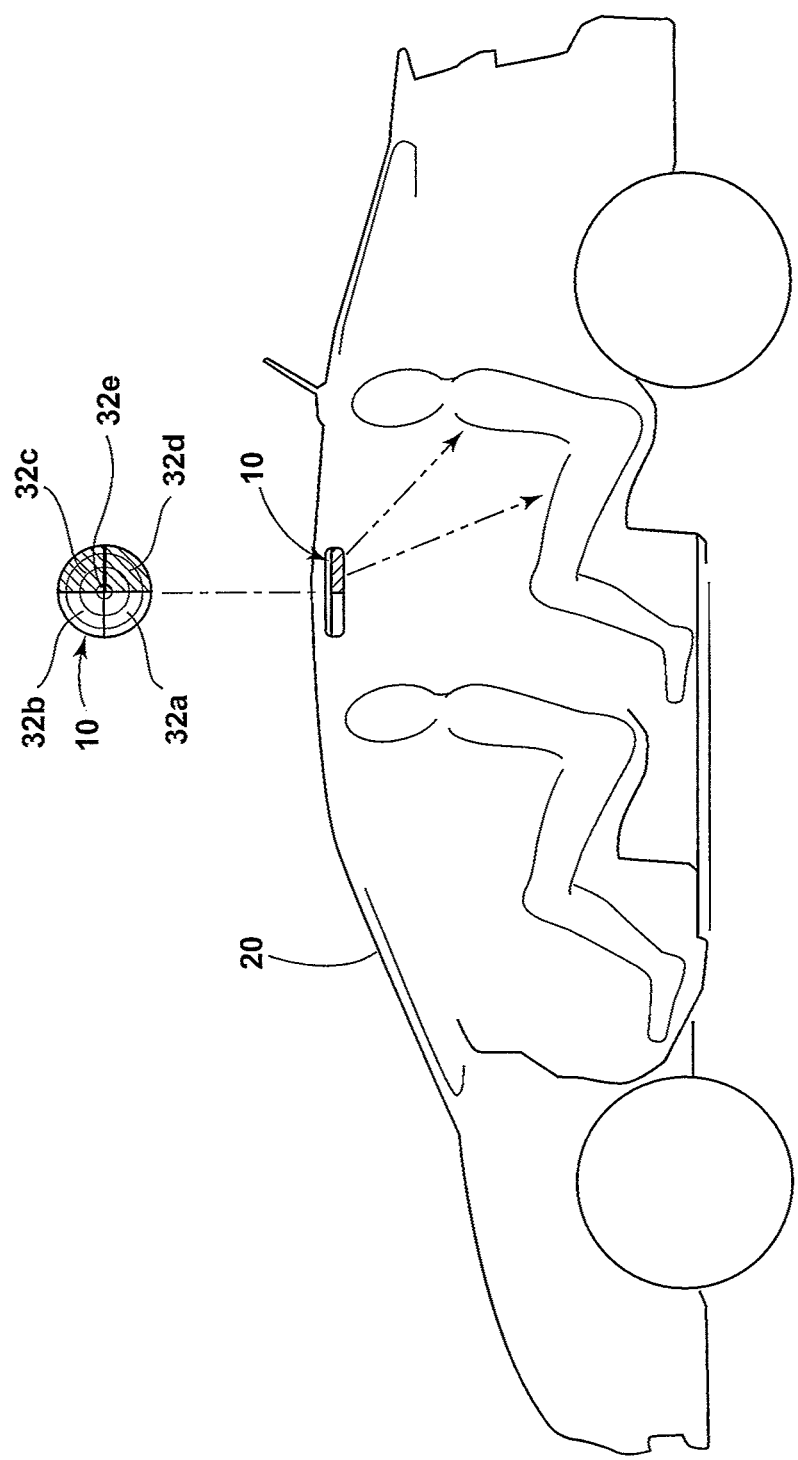
Figure 8:
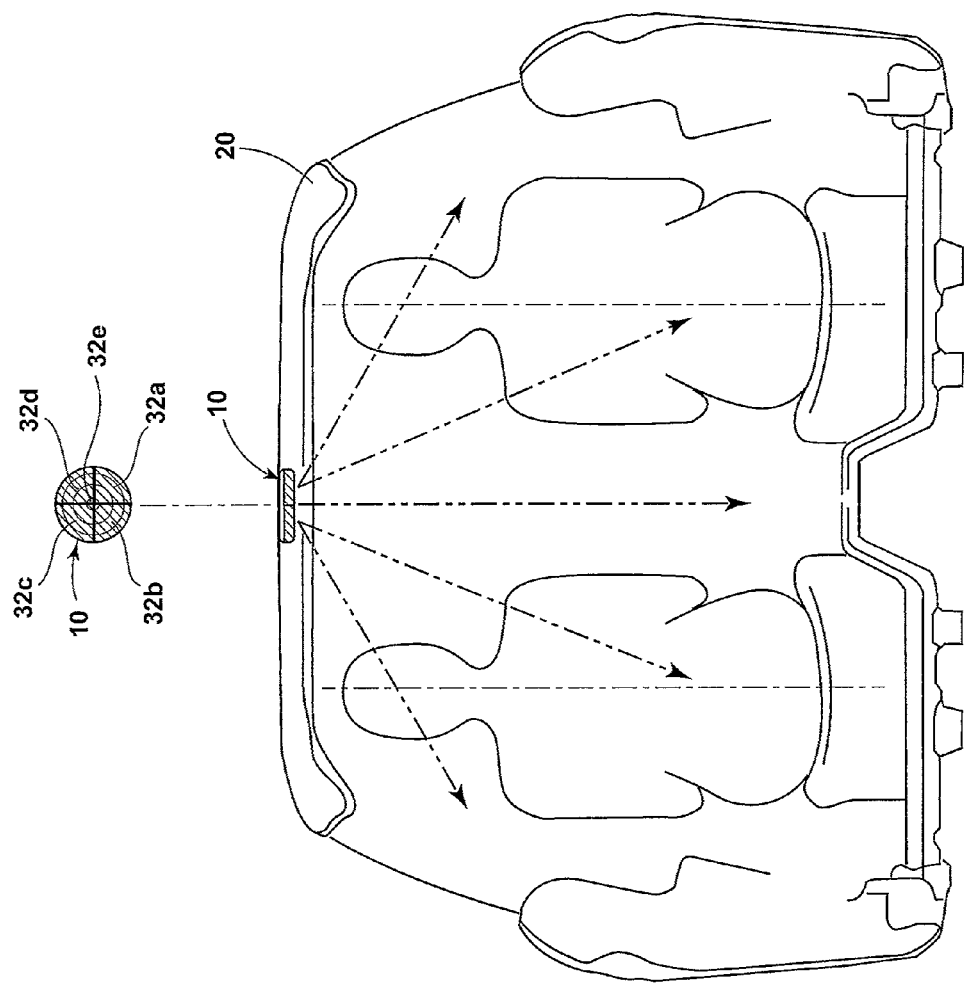

According to one embodiment, the light assembly 10 may be divided into a plurality of light-emitting regions, exemplarily shown in FIG. 5 as a first region 32a, a second region 32b, a third region 32c, a fourth region 32d and a fifth region 32e, respectively. The regions 32a-32e may be visually identified to user or otherwise left unidentified. Each region 32a-32e includes a corresponding portion of the sensor arrangement 15, as well as the portions of the optic 13 and the light sources 12 located thereunder. In this way, the light assembly 10 can be positioned within the vehicle 20 such that each region 32a-32e illuminates a distinct area by virtue of the light-directing elements 14 of optic 13. For example, as shown in FIGS. 6-8, the light assembly 10 may be configured as a dome lamp, wherein regions 32a and 32b are positioned vehicle-frontward and regions 32c and 32d are positioned vehicle-rearward.

In operation, each region 32a-32e may be selectively activated in response to a touch event on the sensor arrangement 15, examples of which will now be provided below. In one embodiment, a single-hand digit touch event on the sensor arrangement 15 triggers one of the regions to illuminate. In some instances, this may be accomplished by touching (e.g., tapping) the desired region of the sensor arrangement 15. For example, a user may touch region 32b, thereby causing the controller 16 to activate only the light sources 12 associated with that region 32b. As a result, region 32b provides illumination to a left side front passenger area of the vehicle 20, as exemplarily shown in FIG. 6. In another embodiment, a multi-hand digit touch event on the sensor arrangement 15 triggers multiple regions to illuminate. For example, a user may simultaneously touch regions 32c and 32d, thereby causing the controller 16 to activate only the light sources 12 associated with those regions 32c, 32d. As a result, regions 32c and 32d together provide illumination to a rear passenger area as exemplarily shown in FIG. 7. More specifically, region 32c provides illumination to the left side rear passenger area of the vehicle 20 whereas region 32d provides illumination to the right side rear passenger area of the vehicle 20. When the vehicle 20 is viewed as oriented in FIG. 7, the left side corresponds to the side of the vehicle 20 sticking out of the page whereas the right side corresponds to the side of the vehicle 20 that sticks into the page. Should a user desire to activate all regions 32a-32e (FIG. 8), the user may simultaneously touch regions 32a-32d, thereby causing all of the light sources 12 to illuminate in concert to flood the vehicle cabin with light.

Figure 9:
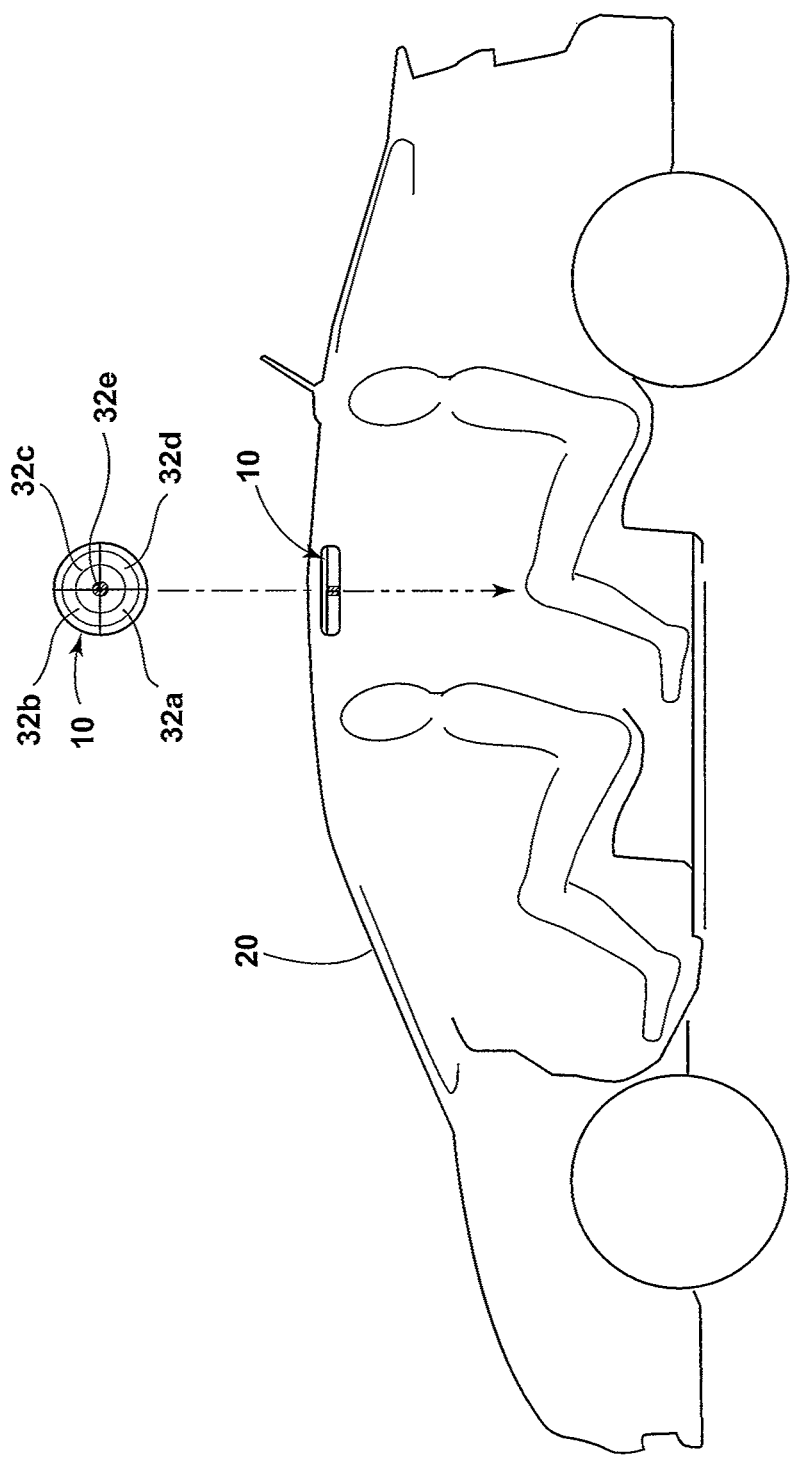
Figure 10:
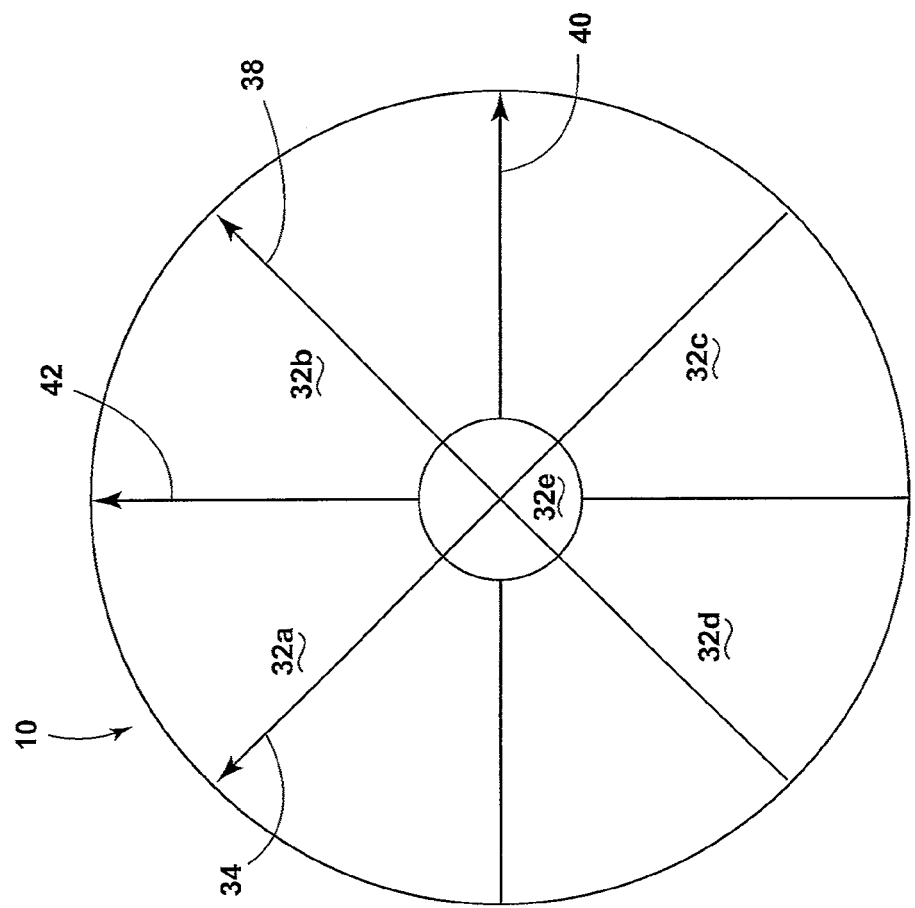
FIG. 10 illustrates a variety of gesture based motions for activating various light-emitting regions of the light assembly.

According to yet another embodiment, exemplarily shown in FIG. 9, region 32e may be activated independently of the other regions 32a-32d. For example, a user may cause region 32e to illuminate by performing a multi-hand digit drag event on the sensor arrangement 15. The multi-hand digit drag event includes using at least two hand digits to perform a pinching motion on the sensor arrangement 15. As a result, the controller 16 activates the light source 12 located at the center of the PCB 24 is activated, which results in region 32e illuminating an area thereunder.

Additionally or alternatively, the regions 32a-32e of the light assembly 10 may be selectively activated via gestures performed in proximity to the sensor arrangement 15. According to one embodiment, one or more of the regions 32a-32e may be activated based on a hand gesture from one end of the light assembly 10 to the other. Depending on which regions 32a-32e are traversed during the gesture, a variety of lighting schemes are possible. For example, a user may activate region 32a by waving his or her hand in the direction specified by arrow 34 in FIG. 10. Region 32c may be activated by performing a hand gesture in the opposite direction of arrow 34. Region 32b may be activated by performing a hand gesture in the direction of arrow 38 whereas region 32d may be activated by performing a hand gesture in the opposite direction of arrow 38. Should a user desire to activate regions 32b and 32c, a hand gesture in the direction specified by arrow 40 may be performed. In the alternative, regions 32a and 32d may be activated by performing a hand gesture in the opposite direction of arrow 40. Likewise, regions 32a and 32b may be activated by performing a hand gesture in the direction of arrow 42 whereas regions 32c and 32d may be activated by performing a hand gesture in the opposite direction of arrow 42. With respect to the embodiments described herein, a currently activated region 32a-32e may be deactivated by repeating the same action (e.g., touch event or gesture) used to activate it or otherwise activating a different region(s). For example, with respect to FIG. 6, region 32b may be deactivated by subsequently touching region 32b again. Alternatively, a kill button located in the vehicle 20 or separate kill region on the sensor arrangement 15 can be employed, if desired. In some embodiments, the intensity of the light outputted by an activated region 32a-32e may be controlled using a user-input device such as a button, touch screen, and the like. In alternative embodiments, a user may control the intensity of the light output via a touch event such as a swipe using a hand digit. For example, when at least one region 32a-32e is activated, a user may swipe his or her finger or thumb along the sensor arrangement 15 in a counterclockwise direction to increase intensity or a clockwise direction to decrease intensity. To decrease the intensity of the light output, the controller 16 may modify the current supplied to whichever light sources 12 are activated through pulsewidth modulation or direct current control, for example.

Figure 12:
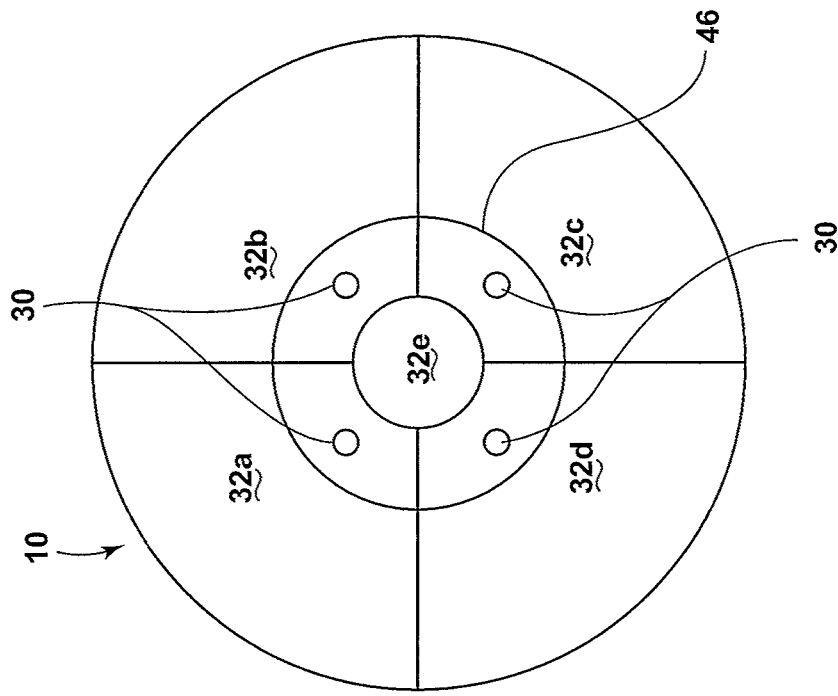
FIG. 12 illustrates yet another alternative embodiment of the sensor arrangement.
Figure 11:
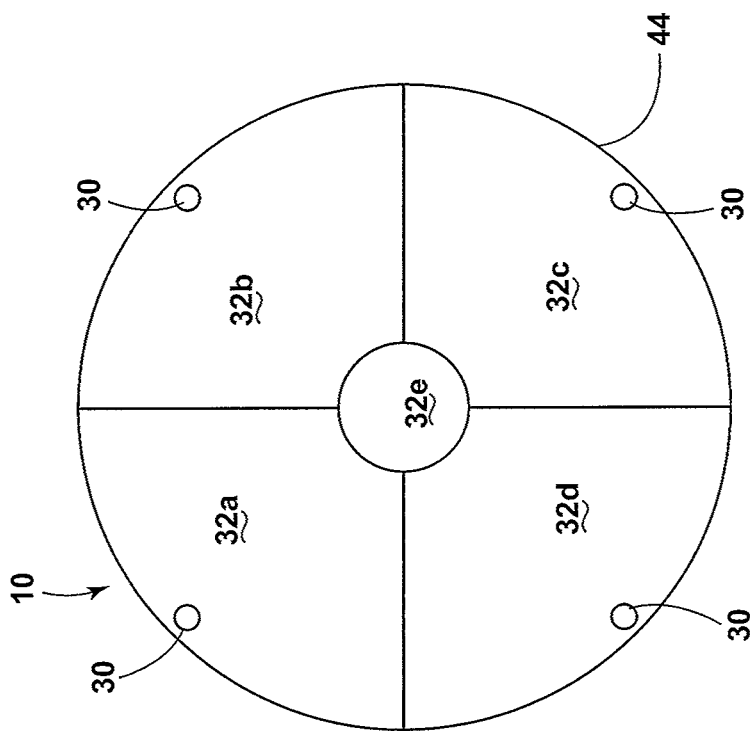
FIG. 11 illustrates an alternative embodiment of the sensor arrangement.

Referring to FIGS. 11 and 12, alternative embodiments of the sensor arrangement 15 are shown. In FIG. 11, the sensor arrangement 15 includes a plurality of proximity sensors 30 disposed proximate a perimeter 44 of the light assembly 10. In FIG. 12, the sensor arrangement 15 includes a plurality of proximity sensors 30 disposed in a central region 46. In operation, the regions 32a-32e may be selectively activated based on one or more of the proximity sensors 30 registering a touch event or gesture. Given the many ways in which the proximity sensors 30 may be dispersed, it should be appreciated that a wide variety of illumination schemes may be realized.

Figure 13:
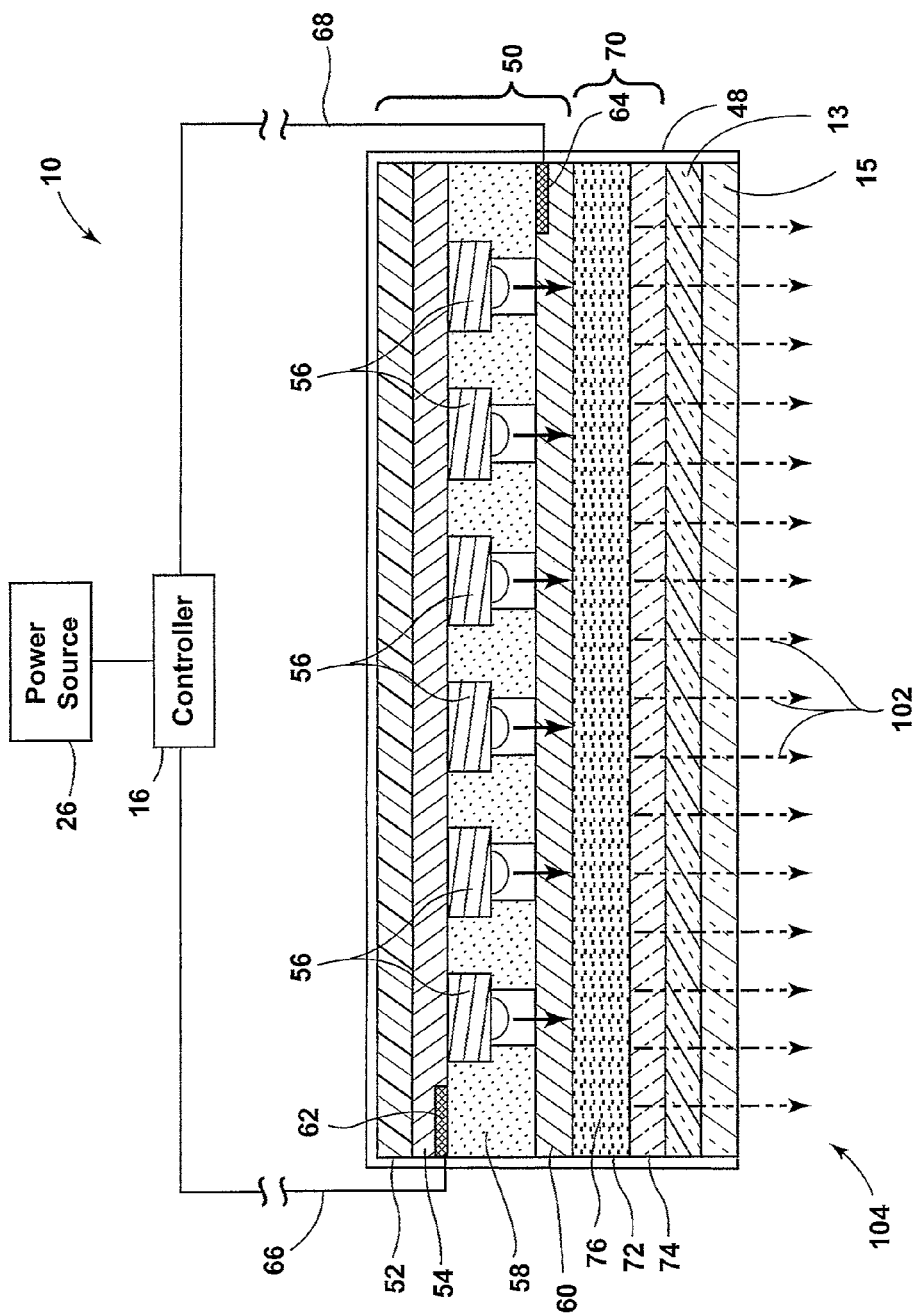
FIG. 13 is a cross-sectional view of an alternative embodiment of the light assembly taken along line XIII-XIII of FIG. 1.

Referring to FIG. 13, an alternative embodiment of the light assembly 10 is shown. Light assembly 10 may include a housing 48 configured to be secured to a roof structure or other vehicle structure. A light-producing assembly 50 may be disposed inside the housing 48 and includes a substrate 52, which may include a substantially transparent polycarbonate, polymethyl methacrylate (PMMA), or polyethylene terephthalate (PET) material on the order of 0.005 to 0.060 inches thick. A positive electrode 54 is arranged over the substrate 52 and includes a conductive epoxy such as, but not limited to, a silver-containing or copper-containing epoxy. The positive electrode 54 is electrically connected to at least a portion of light sources, such as light emitting diodes (LEDs) 56, which are arranged within a semiconductor ink 58 and applied over the positive electrode 54. A substantially transparent negative electrode 60 is also electrically connected to at least a portion of the LEDs 56. The negative electrode 60 is arranged over the semiconductor ink 58 and includes a transparent or translucent conductive material such as, but not limited to, indium tin oxide. In alternative embodiments, the positive electrode 54 may be flip-flopped with the negative electrode 60.

Each of the positive and negative electrodes 54, 60 are electrically connected to a controller 16 via a corresponding bus bar 62, 64 connected to a corresponding wiring 66, 68. The bus bars 62, 64 may be printed along opposite edges of the positive and negative electrodes 54, 60 and the points of connection between the bus bars 62, 64 and the wirings 66, 68 may be at opposite corners of each bus bar 62, 64 to promote uniform current distribution along the bus bars 62, 64. As described previously herein, the controller 16 may also be electrically connected to power source 26, which may correspond to a vehicular power source operating at 12 to 16 VDC.

The LEDs 56 may be dispersed in a random or controlled fashion within the semiconductor ink 58 and are disposed facing vehicle-outward and configured to emit focused or non-focused light. The LEDs 56 may correspond to micro-LEDs of gallium nitride elements on the order of 5 to 400 microns in size and the semiconductor ink 58 may include various binders and dielectric material including, but not limited to, one or more of gallium, indium, silicon carbide, phosphorous, and/or translucent polymeric binders. In this manner, the semiconductor ink 58 may contain various concentrations of LEDs 56 such that the density of the LEDs 56 may be adjusted for various lighting applications. The semiconductor ink 58 can be applied through various printing processes, including ink jet and silk screen processes to selected portion(s) of the positive electrode 54. More specifically, it is envisioned that the LEDs 56 are dispersed within the semiconductor ink 58, and shaped and sized such that a substantial quantity of them align with the positive and negative electrodes 54, 60 during deposition of the semiconductor ink 58. The portion of the LEDs 56 that ultimately are electrically connected to the positive and negative electrodes 54, 60 may be selectively activated and deactivated by the controller 16.

The light assembly 10 of the presently illustrated embodiment further includes at least one photoluminescent structure 70 arranged over the negative electrode 60 as a coating, layer, film or other suitable deposition. With respect to the presently illustrated embodiment, the photoluminescent structure 70 may be arranged as a multi-layered structure including an energy conversion layer 72 and an optional stability layer 74. The energy conversion layer 72 includes at least one photoluminescent material 76 having energy converting elements with phosphorescent or fluorescent properties. For example, the photoluminescent material 76 may include organic or inorganic fluorescent dyes including rylenes, xanthenes, porphyrins, phthalocyanines. Additionally or alternatively, the photoluminescent material 76 may include phosphors from the group of Ce-doped garnets such as YAG:Ce. The energy conversion layer 72 may be prepared by dispersing the photoluminescent material 76 in a polymer matrix to form a homogenous mixture using a variety of methods. Such methods may include preparing the energy conversion layer 72 from a formulation in a liquid carrier medium and coating the energy conversion layer 72 to the negative electrode 60 or other desired substrate. The energy conversion layer 72 may be applied to the negative electrode 60 by painting, screen printing, flexography, spraying, slot coating, dip coating, roller coating, and bar coating. Alternatively, the energy conversion layer 72 may be prepared by methods that do not use a liquid carrier medium. For example, the energy conversion layer 72 may be rendered by dispersing the photoluminescent material 76 into a solid state solution (homogenous mixture in a dry state) that may be incorporated in a polymer matrix formed by extrusion, injection, compression, calendaring, thermoforming, etc.

To protect the photoluminescent material 76 contained within the energy conversion layer 72 from photolytic and thermal degradation, the photoluminescent structure 70 may optionally include stability layer 74. The stability layer 74 may be configured as a separate layer optically coupled and adhered to the energy conversion layer 72 or otherwise integrated therewith. The stability layer 74 may be combined with the energy conversion layer 72 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

According to one embodiment, the photoluminescent structure 70 is configured to luminesce in response to excitation by light emitted by the LEDs 56. More specifically, the light emitted by LEDs 56 undergoes an energy conversion where it's converted by the photoluminescent material 76 and re-emitted therefrom at a different wavelength. Light emitted by the LEDs 56 is referred to herein as inputted light, whereas light re-emitted from the photoluminescent material 76 is referred to herein as converted light. According to one embodiment, the photoluminescent material 76 may be formulated to convert inputted light into a longer wavelength light, otherwise known as down conversion. Alternatively, the photoluminescent material 76 may be formulated to convert inputted light into a shorter wavelength light, otherwise known as up conversion. Under either approach, light converted by the photoluminescent material 76 may be immediately outputted from the photoluminescent structure 70 or otherwise used in an energy cascade, wherein the converted light serves as inputted light to excite another formulation of photoluminescent material located within the energy conversion layer 72, whereby the subsequent converted light may then be outputted from the photoluminescent structure 70 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 76 is formulated to have a Stokes shift resulting in the converted light having an emission spectrum expressed in a desired color, which may vary depending on the lighting application. For example, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 56, which may offer a relative cost advantage over other colors of LEDs or simply using LEDs of the desired color and omitting the photoluminescent structure 70 altogether.

In alternative embodiments, the energy conversion layer 72 may include more than one distinct photoluminescent material, each configured to convert inputted light into a longer or shorter wavelength light. In one embodiment, the distinct photoluminescent materials may be interspersed within the energy conversion layer 72. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 56, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that would otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which are incorporated herein by reference.

Referring still to FIG. 13, the optic 13 and sensor arrangement 15 may each be arranged in turn over the photoluminescent structure 70. Optic 13 and sensor arrangement 15 may each be configured pursuant to any of the embodiments described herein. Furthermore, the light assembly 10 of the present embodiment may also be arranged in light-emitting regions 32a-32e as described previously herein. In such an arrangement, each region 32a-32e includes the corresponding portion of the sensor arrangement 15 in addition to the portion of the photoluminescent structure 70 and light-producing assembly 50 located thereunder, wherein luminescent light outputted from the photoluminescent structure 70 serves as the light outputted from the light assembly 10. Each region 32a-32e may be activated pursuant to any of the embodiments disclosed previously herein.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A light assembly of a vehicle, comprising:
   an array of light sources coupled to a ceiling of the vehicle;
   an optic covering the light source and having light-directing elements for outputting light received from the light sources, wherein the optic comprises a circular light-directing element located at a center of the optic and a plurality of light-directing elements arranged as rings that are concentric with the circular light-directing element, wherein the circular light-directing element is planar and is configured to transmit incident light through the center of the optic and the plurality of light-directing elements together define a sawtooth arrangement and are configured to direct incident light away from the center of the optic; and
   a sensor arrangement covering the optic and having sensors located in different regions and configured to sense a user-supplied action specifying one or more regions resulting in the activation of one or more lights located under the specified one or more regions.

2. The light assembly of claim 1, wherein the regions comprise a central region of the sensor arrangement and a plurality of regions enclosing the central region and extending outward therefrom.

3. The light assembly of claim 1, wherein the user supplied action comprises a touch event on one or more regions of the sensor arrangement.

4. The light assembly of claim 1, wherein the user-supplied action comprises a gesture specifying one or more regions based on a direction in which the gesture is made relative to the sensor arrangement.

5. The light assembly of claim 1, configured as a dome lamp and operable to illuminate at least one of a front passenger compartment and a rear passenger compartment of a vehicle.

6. A light assembly of a vehicle, comprising:
   an array of light sources coupled to a ceiling of the vehicle;
   a photoluminscent structure configured to luminesce in response to light excitation from the light sources;
   an optic covering the light sources and photoluminescent structure and having light-directing elements for outputting luminescent light received from the photoluminescent structure, wherein the optic comprises a circular light-directing element located at a center of the optic and a plurality of light-directing elements arranged as rings that are concentric with the circular light-directing element; and
   a sensor arrangement covering the optic and having sensors located in different regions and configured to sense a user-supplied action specifying one or more regions resulting in the activation of one or more lights located under the specified one or more regions.

7. The light assembly of claim 6, wherein the circular light-directing element is planar and is configured to transmit incident light through the center of the optic and the plurality of light-directing elements together define a sawtooth arrangement and are configured to direct incident light away from the center of the optic.

8. The light assembly of claim 6, wherein the regions comprise a central region of the sensor arrangement and a plurality of regions enclosing the central region and extending outward therefrom.

9. The light assembly of claim 6, wherein the user-supplied action comprises a touch event on one or more regions of the sensor arrangement.

10. The light assembly of claim 6, wherein the user-supplied action comprises a gesture specifying one or more regions based on a direction in which the gesture is made relative to the sensor arrangement.

11. The light assembly of claim 6, configured as a dome lamp and operable to illuminate at least one of a front passenger compartment and a rear passenger compartment of a vehicle.

12. A light assembly of a vehicle, comprising:
   an array of light sources;
   an optic covering the light sources and having light-directing elements for outputting light received from the light sources, wherein the optic comprises a circular light-directing element located at a center of the optic and a plurality of light-directing elements arranged as rings that are concentric with the circular light-directing element, wherein the circular light-directing element is planar and is configured to transmit incident light through the center of the optic and the plurality of light-directing elements together define a sawtooth arrangement and are configured to direct incident light away from the center of the optic; and
   a sensor arrangement covering the optic and having sensors configured to sense a user-supplied action specifying one or more regions resulting in the activation of one or more lights located under the specified one or more regions;
   wherein the light assembly is configured as a dome lamp and specification of one or more regions allows different areas inside the vehicle to be illuminated.

13. The light assembly of claim 12, further comprising a photoluminscent structure configured to luminesce in response to light excitation from the light sources.

14. The light assembly of claim 12, wherein the user-supplied action comprises a touch event on one or more regions of the sensor arrangement.

15. The light assembly of claim 12, wherein the user-supplied action comprises a gesture specifying one or more regions based on a direction in which the gesture is made relative to the sensor arrangement.

* * * * *